(No Model.)
A. M. EASTMAN.
Joints for Metallic Furniture.
No. 230,254          Patented July 20, 1880.
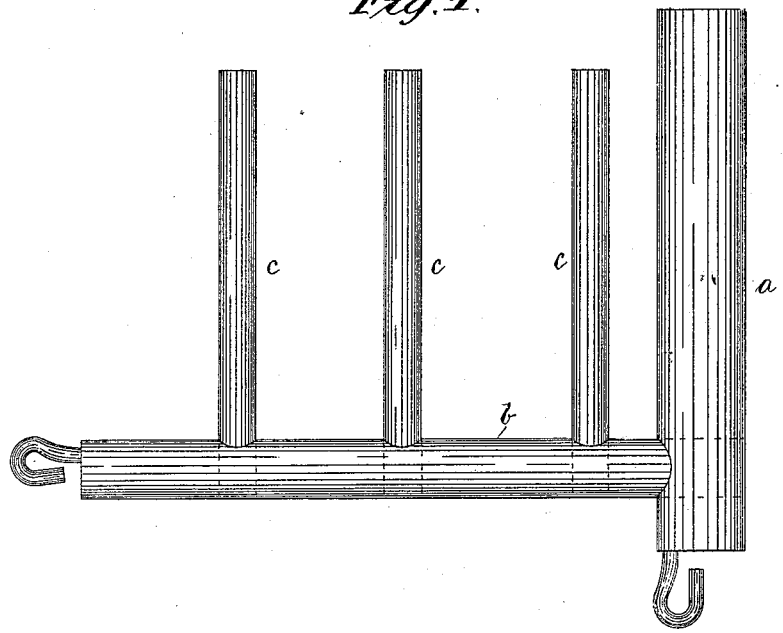
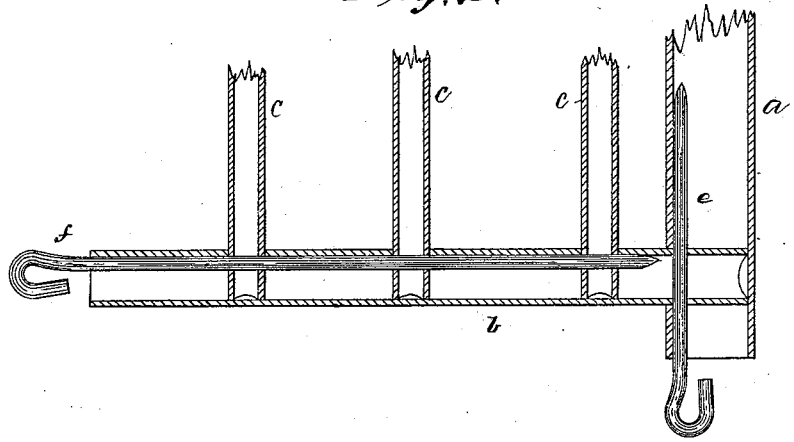
Witnesses—
L. F. Connor.
Vasco D. Dearborn.
Inventor—
Andrew M. Eastman,
by Crosby & Gregory Attys

UNITED STATES PATENT OFFICE.

ANDREW M. EASTMAN, OF SOMERVILLE, ASSIGNOR TO TUCKER MANUFACTURING COMPANY, OF BOSTON, MASSACHUSETTS.

JOINT FOR METALLIC FURNITURE.

SPECIFICATION forming part of Letters Patent No. 230,254, dated July 20, 1880.

Application filed March 15, 1880. (No model.)

*To all whom it may concern:*

Be it known that I, ANDREW M. EASTMAN, of Somerville, in the county of Middlesex and State of Massachusetts, have invented an Improvement in Joints for Metallic Furniture, of which the following is a specification.

This invention relates to metallic furniture composed chiefly of tubes; and it consists, essentially, in the means employed for connecting and securing the tubes together to avoid brazing or using screws.

I have in this my invention adopted the plan of providing the sides of the larger tubes with openings, in which are inserted the free ends of the smaller tubes, the ends of one or more tubes within one common tube being secured by one pin or bolt inserted longitudinally within the larger tube and extended through suitable openings in the ends of the smaller tubes, as herein shown and described.

In this my invention the tubes may be quickly and cheaply assembled into the desired form, and be held very firmly in position, and may be readily taken apart when desired.

Figure 1 represents a sufficient portion of one part of the foot-board of a bedstead to illustrate and explain this my invention, and Fig. 2 a vertical section thereof.

The large upright tube $a$ may be considered one of the corner-posts, the tube $b$ as one of the cross-connections between the corner-posts, and the series of small tubes as those which fill in the foot-board, as it is generally called. The upper cross tube or connection into which the upper ends of the tubes $c$ enter is omitted.

The tube $a$ has at its sides openings of suitable shape to receive the tubes $b$, and the tube $b$ in turn has openings at its side to receive the ends of the series of tubes $c$. The end of tube $b$, being inserted within the tube $a$ and abutted against the inner side of the opposite side of the outermost tube, is locked in position by a wire or other pin, $e$, entered through holes in the smaller of the two tubes, the said holes to receive the pin $e$ being made at such distance from the end of tube $b$ as to insure that the pin $e$ rest close against the inner wall of the tube $a$.

In a like manner each tube of the series of tubes $c$ inserted in tube $b$ is locked by the long pin $f$. Bedsteads, chairs, cribs, and other tubular furniture may be made and assembled in this way.

I claim—

A metal tube provided with a side opening, combined with a second transversely-perforated metal tube inserted within the said opening in the first tube with its end in contact with the interior of the first tube, and with a pin, $e$, to pass through the second or smaller tube and bolt it in place, as and for the purpose described.

In testimony whereof I have signed my name to this specification in the presence of two subscribing witnesses.

ANDREW M. EASTMAN.

Witnesses:
   JOS. P. LIVERMORE,
   L. F. CONNOR.